US00RE34336E

United States Patent [19]

Wade et al.

[11] E Patent Number: Re. 34,336

[45] Reissued Date of Patent: Aug. 10, 1993

[54] UNCOOLED OILLESS INTERNAL COMBUSTION ENGINE HAVING UNIFORM GAS SQUEEZE FILM LUBRICATION

[75] Inventors: Wallace R. Wade, Farmington Hills; Vemulapalli D. N. Rao, Bloomfield Township, Oakland County; Peter H. Havstad, Plymouth, all of Mich.

[73] Assignee: Ford Motor Company, Dearborn, Mich.

[21] Appl. No.: 729,016

[22] Filed: Jul. 10, 1991

Related U.S. Patent Documents

Reissue of:

[64] Patent No.: 4,846,051
Issued: Jul. 11, 1989
Appl. No.: 159,614
Filed: Feb. 23, 1988

[51] Int. Cl.[5] ..... F01B 31/00

[52] U.S. Cl. ..... 92/127; 92/153; 92/154; 92/162 R; 92/170.1; 92/248; 92/261; 123/193.2

[58] Field of Search ..... 92/126, 127, 153, 154, 92/158, 159, 162 R, 170.1, 248, 187, 209, 212, DIG. 1, DIG. 2, 261, 222, 73; 123/193.6, 193.2, 193.4

[56] References Cited

U.S. PATENT DOCUMENTS

| | | | |
|---|---|---|---|
| 2,857,220 | 10/1958 | Jonkers | 92/209 |
| 4,419,971 | 12/1983 | Nakamura et al. | 123/193.2 |
| 4,512,290 | 4/1985 | Ficht et al. | 123/56 BC |
| 4,541,786 | 9/1985 | McLean | 415/214 |
| 4,651,629 | 3/1987 | Castarede | 123/193.6 |
| 4,719,079 | 1/1988 | Tsuno et al. | 123/193.6 |
| 4,777,844 | 10/1988 | De Bell et al. | 92/222 |

FOREIGN PATENT DOCUMENTS

| | | | |
|---|---|---|---|
| 563277 | 1/1958 | Belgium | 92/153 |
| 3243939 | 5/1984 | Fed. Rep. of Germany | 92/222 |
| 3303229 | 8/1984 | Fed. Rep. of Germany | 123/193.4 |
| 170444 | 9/1984 | Japan | 123/193.4 |
| 2112454 | 7/1983 | United Kingdom | 92/170 |

OTHER PUBLICATIONS

Wade et al., "A Structural Ceramic Diesel Engine–The Critical Elements", Feb. 1987.

"A Low Friction, Unlubricated Silicon Carbide Diesel Engine", SAE Paper #830313, by Timoney et al.

*Primary Examiner*—Thomas E. Denion

*Attorney, Agent, or Firm*—Joseph W. Malleck; Roger L. May

[57] ABSTRACT

An apparatus for providing a gas phase film lubrication between a reciprocal piston and a cylinder of an uncooled oilless internal combustion engine; the piston is effective to drive a rotary crankshaft in response to an expanding gas charge. The apparatus comprises: (a) means connecting the crankshaft to said piston for transferring reciprocal thrust into rotary thrust, such means aligning the piston concentrically within the cylinder wall to limit the imposition of side loads on said piston (i.e., less than 80 psi); (b) interfacing walls on the piston and cylinder (i) sized to provide a predetermined annular gap therebetween at ambient conditions that has a radial dimension in the range of $0.001 \pm 0.0005$ inches, (ii) consisting of matched materials that prevent closure of the gap due to thermal expansion under the maximum temperature differential to be experienced between the piston and cylinder wall, and (iii) are preshaped to anticipate any thermal growth of the interfacing walls for maintaining the annular gap substantially constant at elevated temperatures.

15 Claims, 9 Drawing Sheets

RINGLESS PISTON OPERATION

BLOW-BY Vs THERMAL EXPANSION

RINGLESS PISTON OPERATION

DIAMETRAL CLEARANCES SHOWN (P) PISTON (B) CYLINDER BORE

UNCOOLED OILLESS INTERNAL COMBUSTION ENGINE HAVING UNIFORM GAS SQUEEZE FILM LUBRICATION

Matter enclosed in heavy brackets [ ] appears in the original patent but forms no part of this reissue specification; matter printed in italics indicates the additions made by reissue.

BACKGROUND OF THE INVENTION

1. Technical Field

This invention relates to the art of engine lubrication and, more particularly, to oilless lubrication for the piston/cylinder chamber of an uncooled engine.

2. Description of the Prior Art

A low heat rejection engine, particularly for a diesel engine, has the potential to provide significant improvement in fuel economy. Heat rejection can be reduced by eliminating liquid cooling normally incorporated in the block of a diesel engine and replacing all or a portion of the combustion chamber components with materials that can operate at uncooled combustion temperatures, such as ceramics. This is sometimes referred to as an adiabatic diesel engine.

The temperature gradient in such low heat rejection engine will range up to 1600° F. (871° C.). At such temperatures, conventional oil, used as a piston lubricant, will pyrolyze. Therefore, some means must be provided to create an antifriction relationship between the cylinder wall and piston which is devoid of fossil lubricants.

One approach, suggested in 1983 by S. Timoney and G. Flynn in an article entitled "A Low Friction, Unlubricated Silicon Carbide Diesel Engine", SAE Paper #830313, was to install a close-fitting SiC piston in a SiC cylinder, the piston having no ring grooves. Blowing of gases past the pistons could not be detected; the authors concluded that the piston must be riding on a gas film due to the reduction in friction horsepower. However, much of their test work was carried out without the engine firing, so a pressurized gas film was not the total reason for nonscuffing but was also due to the low interfacial friction of SiC on SiC. The structure of the Timoney and Flynn piston and cylinder had made no accommodation for thermal growth and assumed uniform dimensions; oil lubrication was fed to the piston pin area which assured little dimensional change and, in fact, contributed to oil lubrication notwithstanding the authors' label of an unlubricated engine. This reference merely defined the problem without providing a specific solution as how to provide a reliable gas phase lubrication while encountering thermal growth, wide variations in the fit, and without oil lubrication. This reference did suggest that if clearances could somehow be controlled, a gas film would function to lubricate the sliding piston in such cylinder.

Thus, it is an object of this invention to be able to control the dimensional clearances between the piston and cylinder of an uncooled oilless internal combustion engine by special selection of materials for anticipated thermal growth and to preshape the cylinder wall and piston to maintain a generally constant gap even under elevated temperatures.

SUMMARY OF THE INVENTION

The invention is an apparatus and a method for providing a gas phase squeeze film lubrication system which operates effectively in an uncooled oilless internal combustion engine. Such engine has a reciprocal piston driving a rotary crankshaft in response to an expanding gas charge to a cylinder containing the piston.

The apparatus aspect of this invention, comprises: (a) means connecting the crankshaft to the piston for transferring reciprocal thrust into rotary thrust, such means aligning the piston concentrically within the cylinder wall to limit the imposition of side loads on the piston; (b) interfacing walls on said piston and cylinder (i) sized to provide a predetermined annular gap therebetween at ambient conditions that has a radial dimension in the range of $0.001 \pm 0.0005$ inches, (ii) consisting of matched materials that prevent closure of said gap due to thermal expansion under the maximum temperature differential to be experienced between said piston and cylinder wall, and (iii) are preshaped to anticipate any thermal growth of the interfacing walls for maintaining the annular gap substantially constant at elevated temperatures.

The method aspect of this invention, comprises the steps of: (a) assuring alignment of the driving connection of the crankshaft to the piston to provide substantial concentricity of the piston within the cylinder wall and to limit side loading of the piston to less than 80 psi; (b) forming at least the interfacing walls of said piston and cylinder to provide an annular gap therebetween at ambient conditions which has a radial dimension in the range of $0.001 \pm 0.0005$ inches, said walls having matched materials to prevent closure of said gap due to thermal expansion under the maximum temperature differential to be experienced between said piston and cylinder wall; and (c) preshaping the walls to anticipate any thermal growth gradient of the walls for maintaining the annular gap substantially constant at elevated temperatures.

To preferably assure concentricity to limit side loading of the piston, the driving connection comprises a pin and connecting rod linkage arranged with the axis of the crankshaft lying in a common plane with the axes of the piston and cylinder wall, all within a tolerance of 0.0004 inches. Advantageously, the driving connection between the crankshaft and piston has (i) the axes parallel within a tolerance of 0.001 inches at bearings comprising: crankshaft to main bearing, crank arm to connecting rod, connecting rod to piston pin, and (ii) has the axes all perpendicular to each other within a tolerance of 0.0004 inches for the: piston pin, connecting rod bearing to pin bearing, and piston travel. Advantageously, the bearings may consist of ceramic bearing elements, particularly the roller elements.

The material for the piston may be silicon nitride and/or a cordierite coating; the material for the cylinder wall may be selected from the group consisting of silicon nitride, silicon carbide, and partially stabilized zirconia.

The annular gap may preferably be dimensioned to limit blow-by of the gas flow charge volume to less than 2% of the flow at engine operating speeds above 1500 rpm.

Preferably, the interfacing walls may be preshaped by chamfering the upper shoulder of the piston crown and by providing a radial taper to the cylinder wall which is narrower at the top of the cylinder wall. The elevated temperatures to be experienced by the piston and/or cylinder wall may preferably be in the range of 800°-1200° C.

DETAILED DESCRIPTION AND BEST MODE

Figure 1:
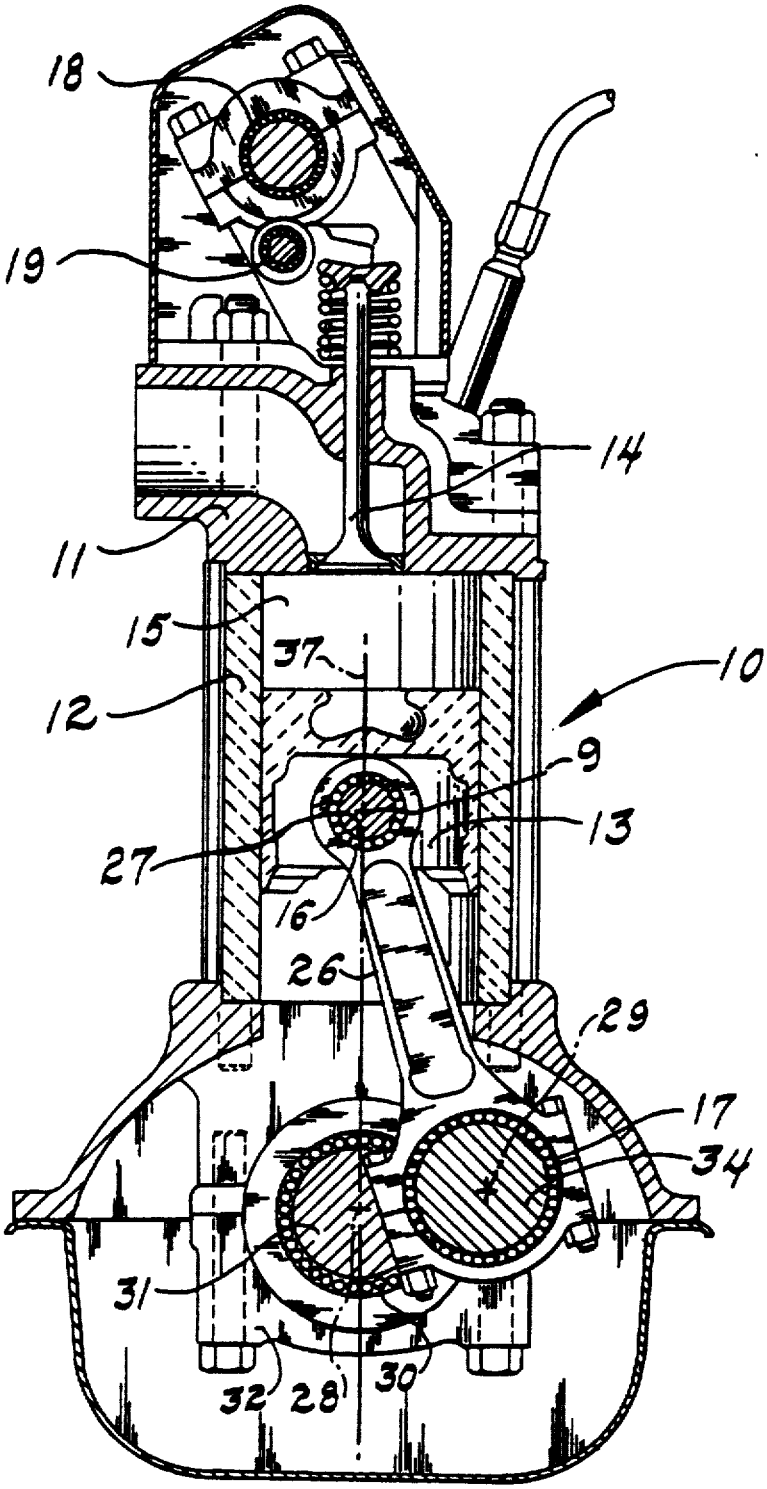
FIG. 1 is a partially sectional and partially schematic view of a four-stroke uncooled oilless engine within which the invention herein is incorporated.

An uncooled oilless four-stroke engine 10 is shown in FIG. 1. Such engine has solid structural ceramic components (head 11, cylinder walls 12, piston 13 and valves 14) in the vicinity of the combustion chamber 15; metal components are eliminated in the high temperature areas of the engine. Uncooled is used herein to mean an engine that is devoid of conventional cooling such as from a water jacket or fins for air cooling. The resulting higher operating temperatures can be projected to provide at least a 9% improvement in the indicated specific fuel consumption relative to a water cooled, base line engine at past load operating conditions (i.e., 1200 rpm at 38 psi BMEP). Since conventional oil lubrication cannot be used at the higher operating temperatures because such oils will pyrolyze, gas phase lubrication is used herein. Oil is also eliminated in the crankcase; without crankcase oil, a sealing system to separate the oil from the hot upper cylinder area, where coking can occur, is not required. Oilless ceramic roller bearings 17 and 16, for the crankshaft and connecting rod respectively, eliminate this need for oil in the crankcase. With ceramic roller bearings for the valve train finger followers and camshaft (19 and 18), as well as suitable dry lubrication, the engine is further simplified by eliminating the need for oil, the oil pump, oil filter and oil gallery drilling. However, oilless is used herein to mean devoid of conventional piston rings between the piston and cylinder wall that are designed to ride on a liquid phase film.

Sintered silicon nitride was used as the material for the structural cylinder wall and piston. Sintered silicon nitride has a coefficient of thermal expansion of about $3.6\times10^{6}$/°C., a modulus of rupture of about 85 ksi which is stable up through the temperature range of 1600° F. and has a thermal conductivity which is about 50% of the value of cast iron.

Figure 2:
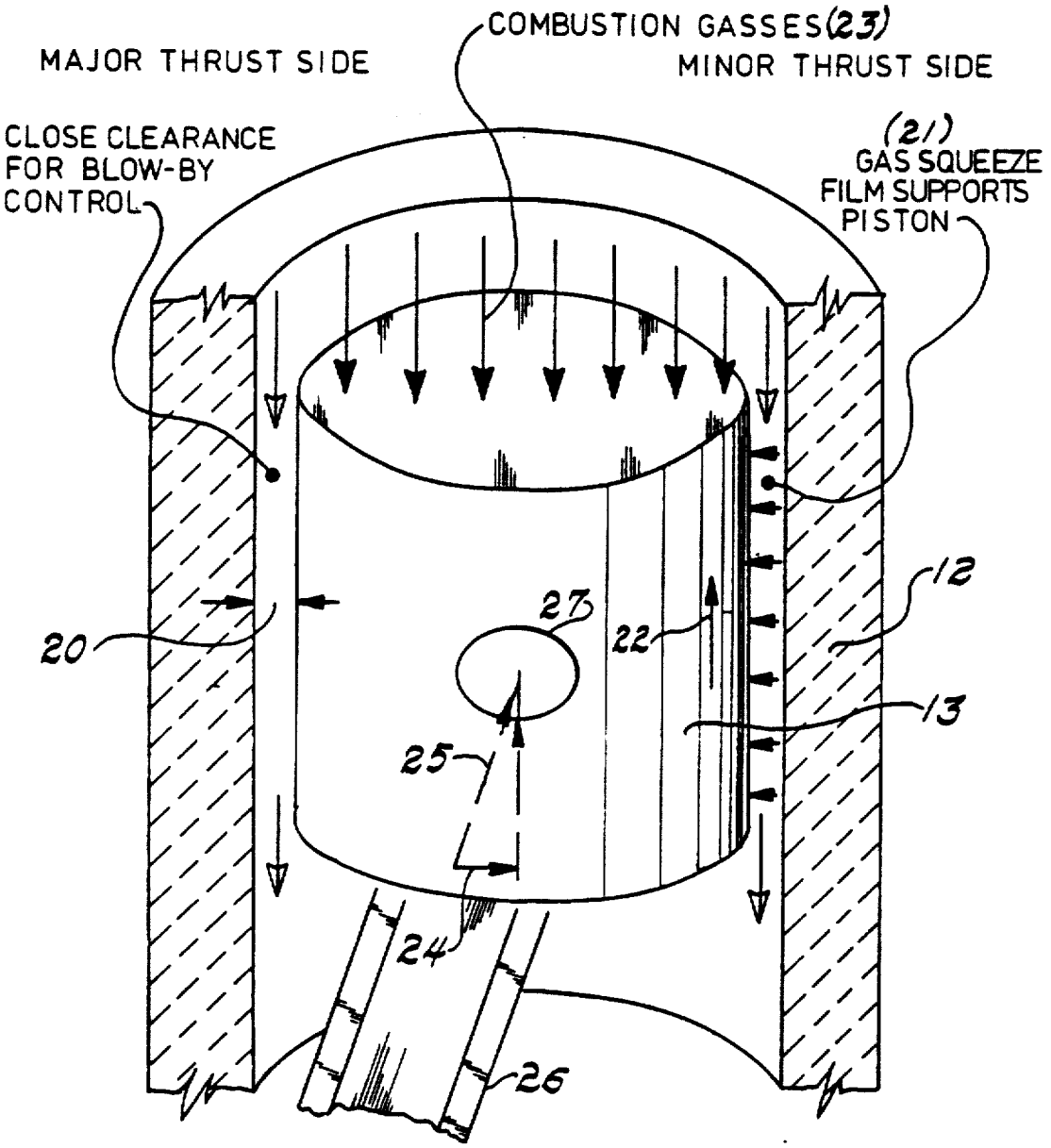
FIG. 2 is an enlarged schematic view of a piston and cylinder assembly, broken away to illustrate more clearly the gas squeeze film concept.

Referring to FIG. 2, gas phase lubrication between the piston 13 and the cylinder wall 12 is dependent on maintaining a tight clearance or annular gap 20 effective in triggering viscous drag 22 to hold a gas phase squeeze film 21 therebetween. Unfortunately, it is very difficult to achieve and maintain a tight and uniform annular gap 20 throughout all aspects of engine operation. The gas film 21, at low pressure gradients (when pressure 23 feeding the gas film is low during exhaust and intake strokes of a four cycle engine) will be essentially trapped between the piston 13 and the cylinder wall 12 and will ride with the piston provided the gap 20 is sufficiently narrow. The gas film at high pressure gradients (when pressure 23 feeding the gas film is high during expansion and compression strokes) will cause blow-by through the gap 20 but will be throttled due to viscous drag of the stationary cylinder wall. Such viscosity will increase with an increase in temperature of the gas at higher engine speeds.

Side loading 24 of the piston (a radially directed component of a reaction force 25 from the connecting rod 26 to the piston pin 27 and thence to the piston 13) will distort concentricity of the piston within the cylinder wall and cause the gap 20 at one side of the piston to begin to close and allow contact between the piston and cylinder wall without gas phase lubrication. When the term "closure of gap" is used, one side of the annulus will move to touch the cylinder wall; it does not necessarily mean the entire annular gap is fully closed.

It is important to this invention to recognize that side loading forces 24 will reach a level of less than 70 psi in an engine having a peak gas pressure of 1600 psi. It should also be noted that when higher peak pressures exist due to change in engine design, the squeeze film pressure will correspondingly increase and prevent piston from touching the cylinder wall at side loading up to 80 psi. The concentricity to limit side loading can be brought about by assuring alignment of the driving connection of the piston to the crankshaft 28 or crank arm 34 (which includes a piston pin 27 and a connecting rod 26). Referring again to FIG. 1, this includes maintaining: (a) the axis 28 of the crankshaft in a common plane with the axes 37 of the piston 13 and cylinder wall 12 all within a tolerance of 0.0004 inches; (b) parallelism within a tolerance of 0.001 inches between the axes 28, 29 and 9 of the following respective bearings: the bearing 30 for the crankshaft 31 to the main bearing cap 32, the bearing 17 for the crank arm 34 to the connecting rod 26, and the bearing 16 for the connecting rod 26 to the piston pin 27; (c) perpendicularity within a tolerance of ±0.0004 inches of the axis 9 of bearing 16, axis (also 9) of the piston pin 27, and central axis 37 of the cylinder wall; and (d) maintaining the several axes 28, 9 and 37 within a common plane (seen as axis 37 in FIG. 1). If this is done, the piston side loading will be limited so that concentricity of the piston during the four-stroke operation will be assured and the gas squeeze film will not be penetrated by the piston.

Figure 3:
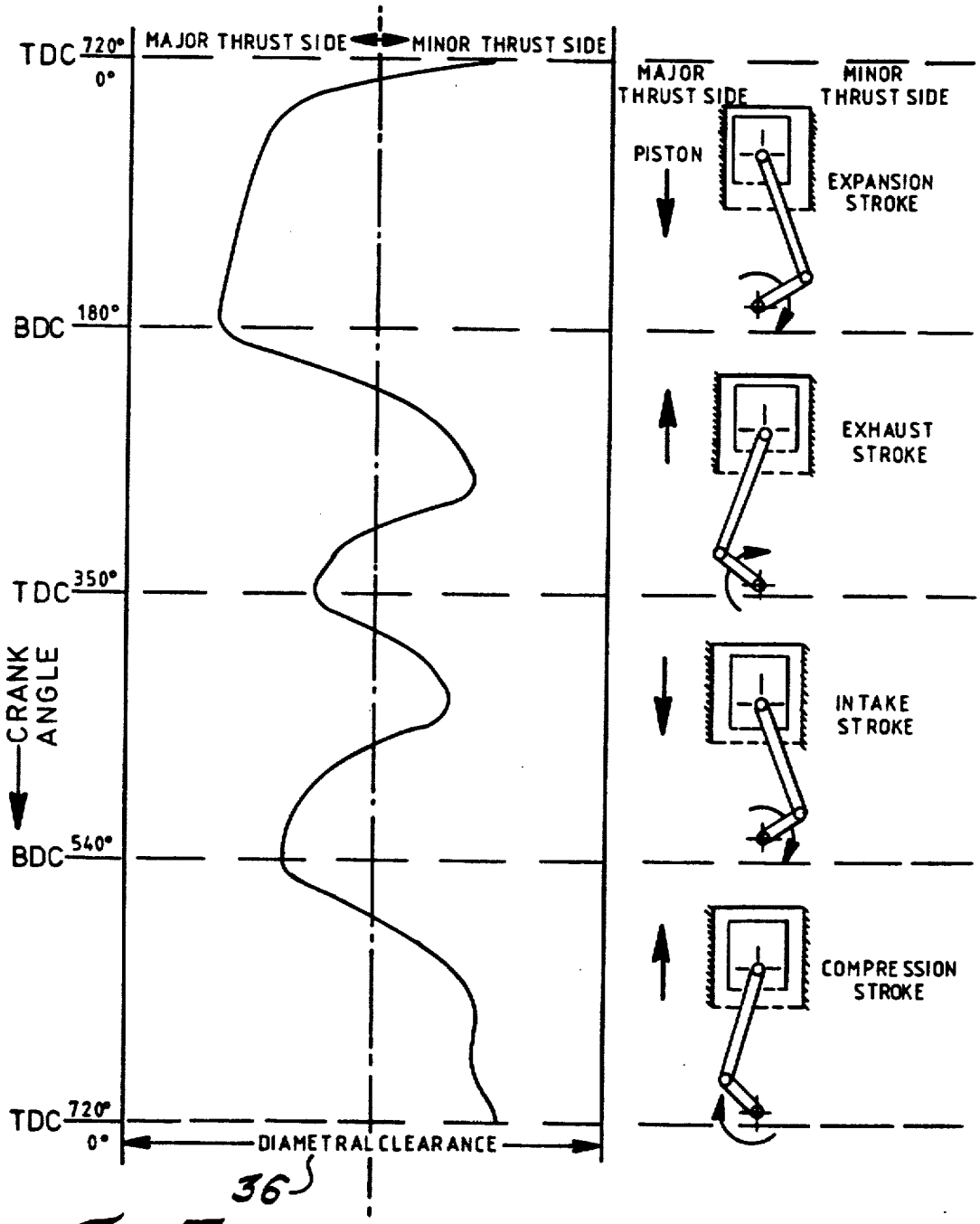
FIG. 3 is a diagram depicting side loading of the piston as a function of crank angle, with positioning of the piston and crank connection being shown in different quadrants of the crank angle.

Turning to FIG. 3, operation of a gas squeeze lubricated piston was calculated by a model. The calculation was for a speed of 4200 rpm and a peak cylinder pressure of 1600 psi. The figure shows the location of the piston, depicted as a solid line 35, within the total available hot diametrical clearance 36 between the piston and cylinder wall for 720° of engine operation. Throughout the operation, it was found that the calculated gas squeeze film was adequate to prevent the piston from contacting the cylinder wall provided the clearance was 0.001±0.0005 inches. The minimum clearance occurred at the bottom dead center of the expansion stroke.

Figure 4:
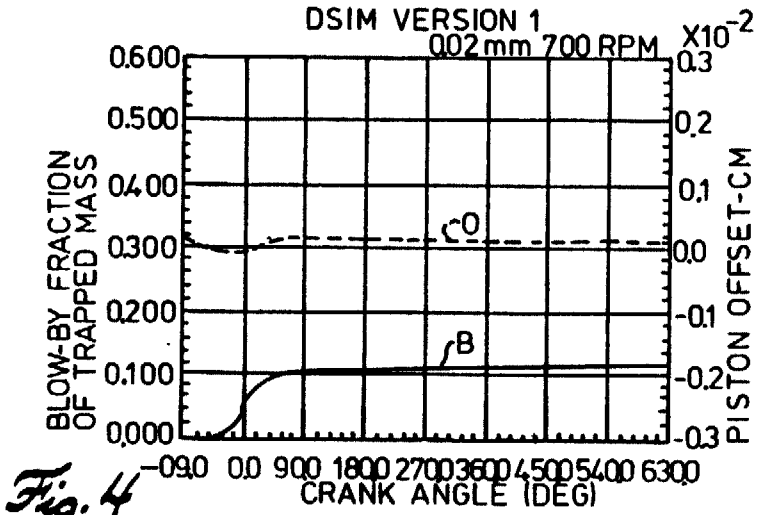
FIGS. 4-7 are graphical illustrations of gas blow-by and piston offset as a function of crank angle, for different gaps, engine speeds and alignments.
Figure 5:
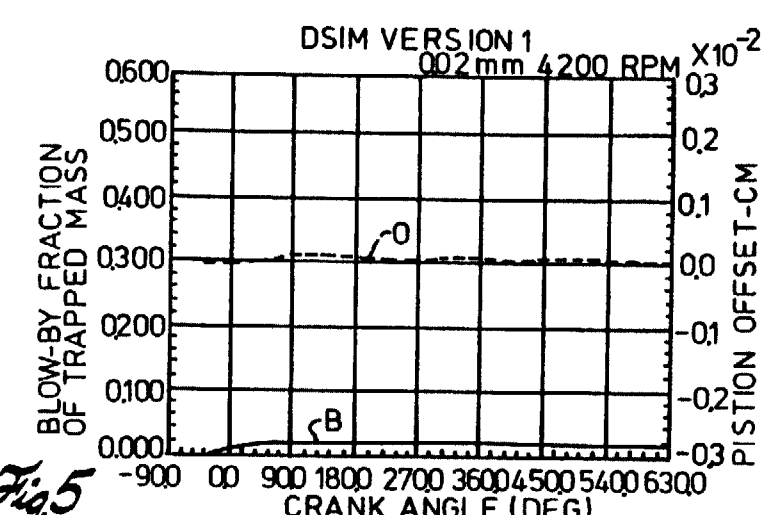
Figure 6:
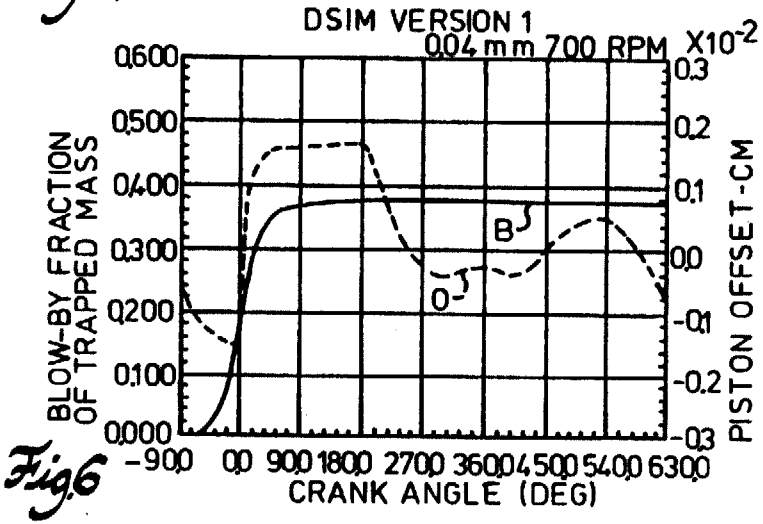
Figure 7:
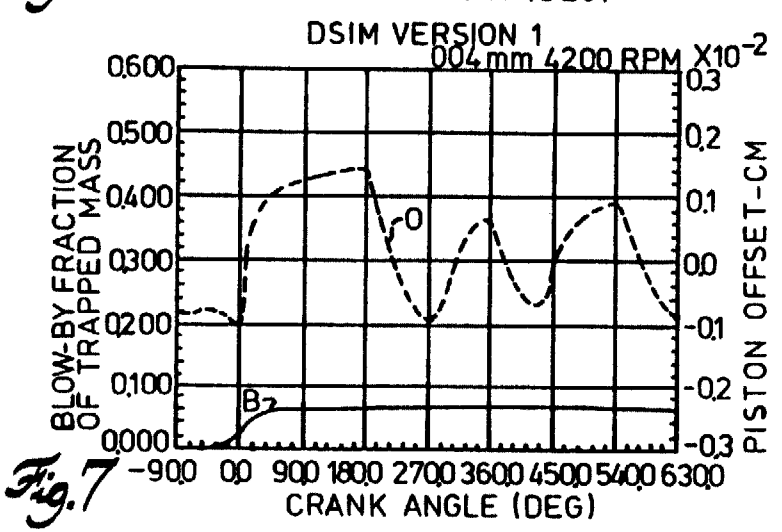
Figure 9:
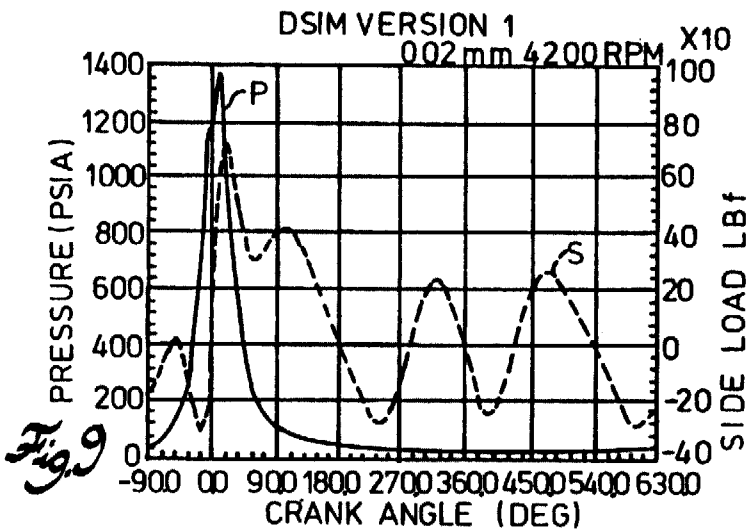
FIGS. 8-11 are graphical illustrations of gas pressure and side load as a function of crank angle, for different gaps, engine speeds and alignments.
Figure 11:
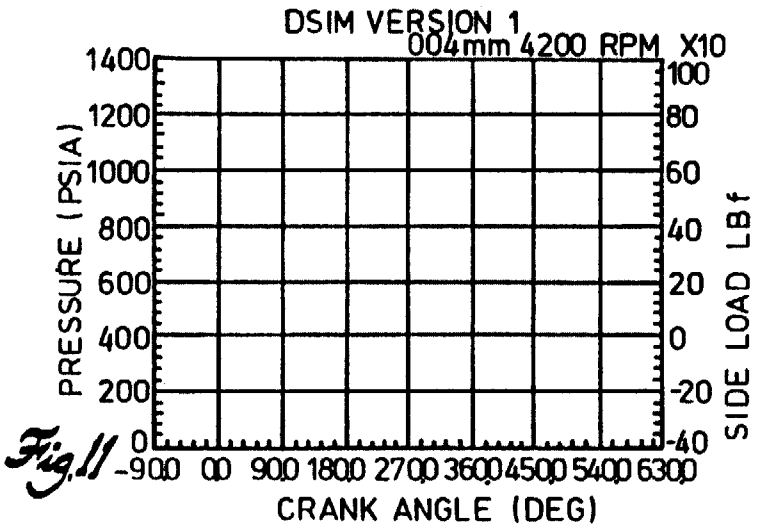
Figure 8:
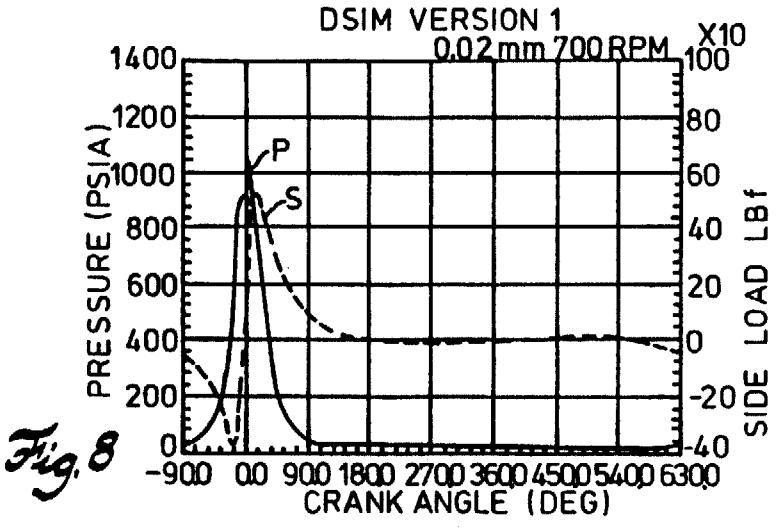
Figure 10:
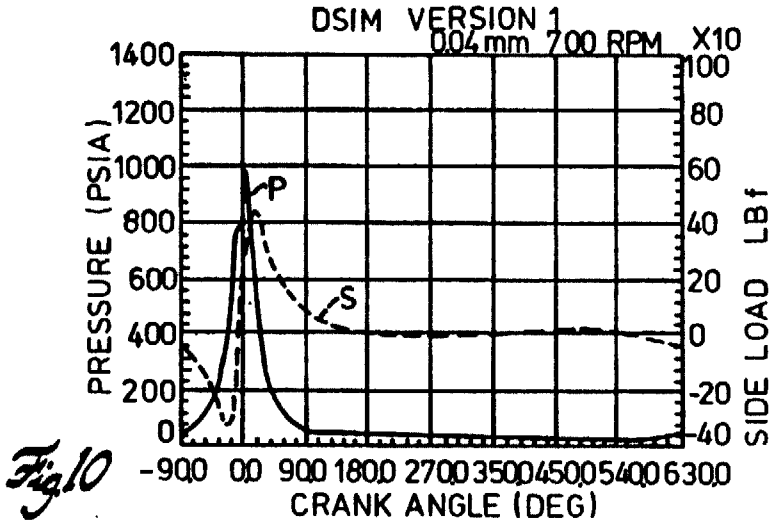

Actual tests of this gas phase squeeze film lubrication system was carried out in engines to determine effective side loading due to nonalignment (offset), as shown in FIGS. 4–11. FIGS. 4 and 5 show how the fluid film blow-by (or percentage of mass flow charge) is limited when the axes are all aligned within the criteria set forth above, FIG. 4 being at 700 rpm and FIG. 5 being at 4200 rpm. The plot labeled "O" is for the degree of offset (which correlates with the degree of misalignment, and plot labeled "B" is for the blow-by in percentage fraction of mass which is trapped. FIG. 8 shows the amount of side loading and pressure that is experienced for the conditions of FIG. 4 and, correspondingly, FIG. 9 shows the amount the side loading pressure that is experienced with the conditions of FIG. 5. Note that side loading does not exceed 600 pounds 700 rpm and does not exceed 450 pounds at 4200 rpm. The units for side loading can be converted from pounds to psi by dividing the pounds force by the area of the piston side wall. Even when the gap is increased to 0.04 mm, as shown in FIGS. 6 and 7, the piston offset will be great enough to close the gap at 700 rpm. Correspondingly, the aberrations of the side load will increase due to inertia at the higher speeds in FIGS. 10 and 11. It should be noted that if the gap is selected small enough as prescribed herein, the side loading will not become more severe at higher engine speeds because the gas phase film cannot be squeezed out of the gap due to its incompressible nature at such velocities and the lesser ability of the piston to travel fast enough from side to side at such higher speeds.

The gap dimension was theoretically calculated and empirical tests were made to corroborate that viscosity of the gas phase increases from room temperature to higher operating temperatures. Gaps in the range of 0.001–0.0015 inches would function to provide a squeeze gas film lubrication between the piston and cylinder wall so that the blow-by would not exceed 2% of the gas flow charge to the combustion chamber at higher speeds (above 1500 rpm). This invention broadly contemplates providing gas phase lubrication with a blow-by of up to 5% (on average of all speeds) of the engine mass flow charge. Normal blow-by of a conventional piston ring engine in use today has an average blow-by of about 2%. This higher toleration of blow-by in this engine is justified because the total engine energy savings from this lubrication system is much greater than the energy lost due to an increase of blow-by up to 5%.

However, several factors intervene to disrupt the effectiveness of the gap 20 during operation of the piston in the engine, even though concentricity of the piston is substantially maintained within the cylinder wall.

Figure 12:
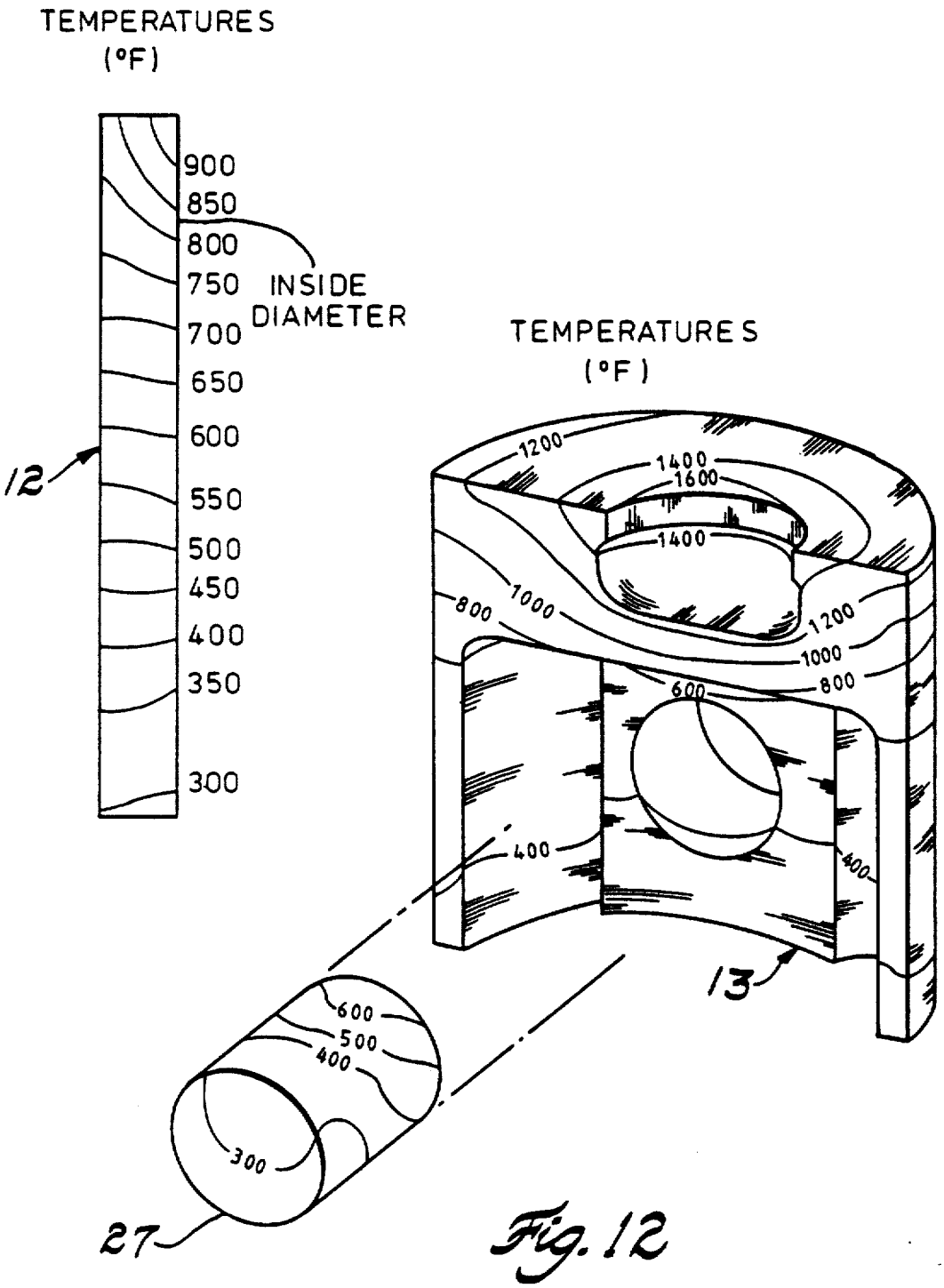
FIG. 12 is a thermal gradient map superimposed on each of the piston and cylinder wall and piston pin.
Figure 14:
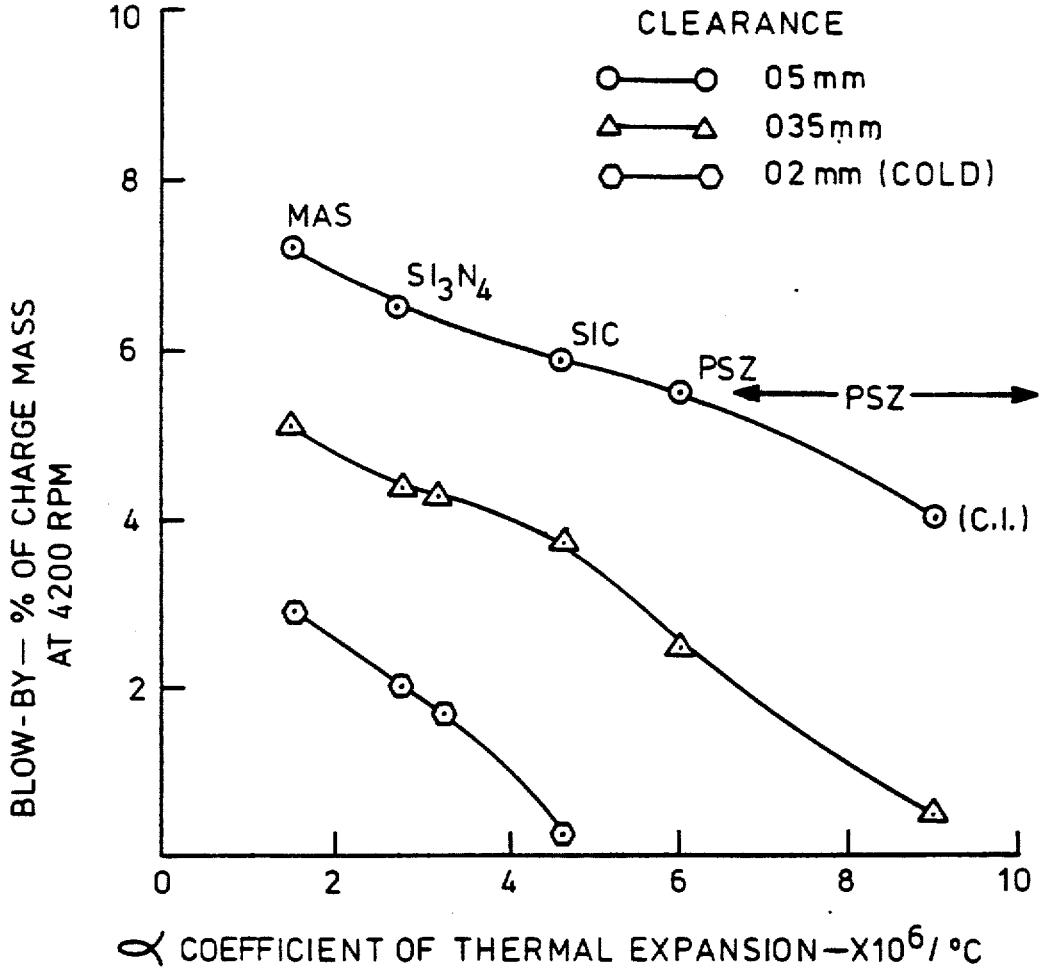
FIG. 14 is a graphical illustration of gas blow-by as a function of the coefficient of thermal expansion for different materials at different gap clearances.

First, the inherent differential thermal expansion of the material selected for either the piston and the cylinder wall will change the gap due to experiencing the maximum temperature differential between the piston and cylinder. For example, looking at FIG. 12 wherein a thermal mapping of the piston 13, cylinder wall 12 and piston pin 27 is displayed, the maximum temperature differential occurs at the upper edge 38 of the piston crown and upper edge 39 of the cylinder wall. This differential to be experienced here between the piston and cylinder wall is 1250 minus 950=300° F. It is possible that this differential can be as little as 300° F. in some engine designs. The materials of the piston and cylinder wall must be matched so that the gap is not closed as a result of experiencing such maximum temperature differential. The piston will get hotter at its piston crown than the opposite facing cylinder wall; accordingly, the piston crown will expand or mushroom outwardly. The cylinder wall, even if made of the same material as the piston, will not move outwardly to the same degree, not only because it is cooler, but because hollow cylindrical structures place restraints on the expansion characteristic. Looking at FIG. 14, it is apparent that the material with the lower coefficient of thermal expansion is more suitable to preventing a closure of the gap (indicated by elimination of blow-by) as the gap is narrowed. For purposes of this invention, it is best to utilize a material having a coefficient of thermal expansion which is less than $6\times10^6$/°C., and preferably less than $4\times10^6$/°C. With this in mind, the material selected for the piston should preferably be silicon nitride or silicon nitride coated with cordierite (magnesium aluminum silicate or MAS). The cylinder wall should preferably be selected from the group consisting of silicon carbide, silicon nitride, and partially stable zirconia (PSZ).

Figure 13:
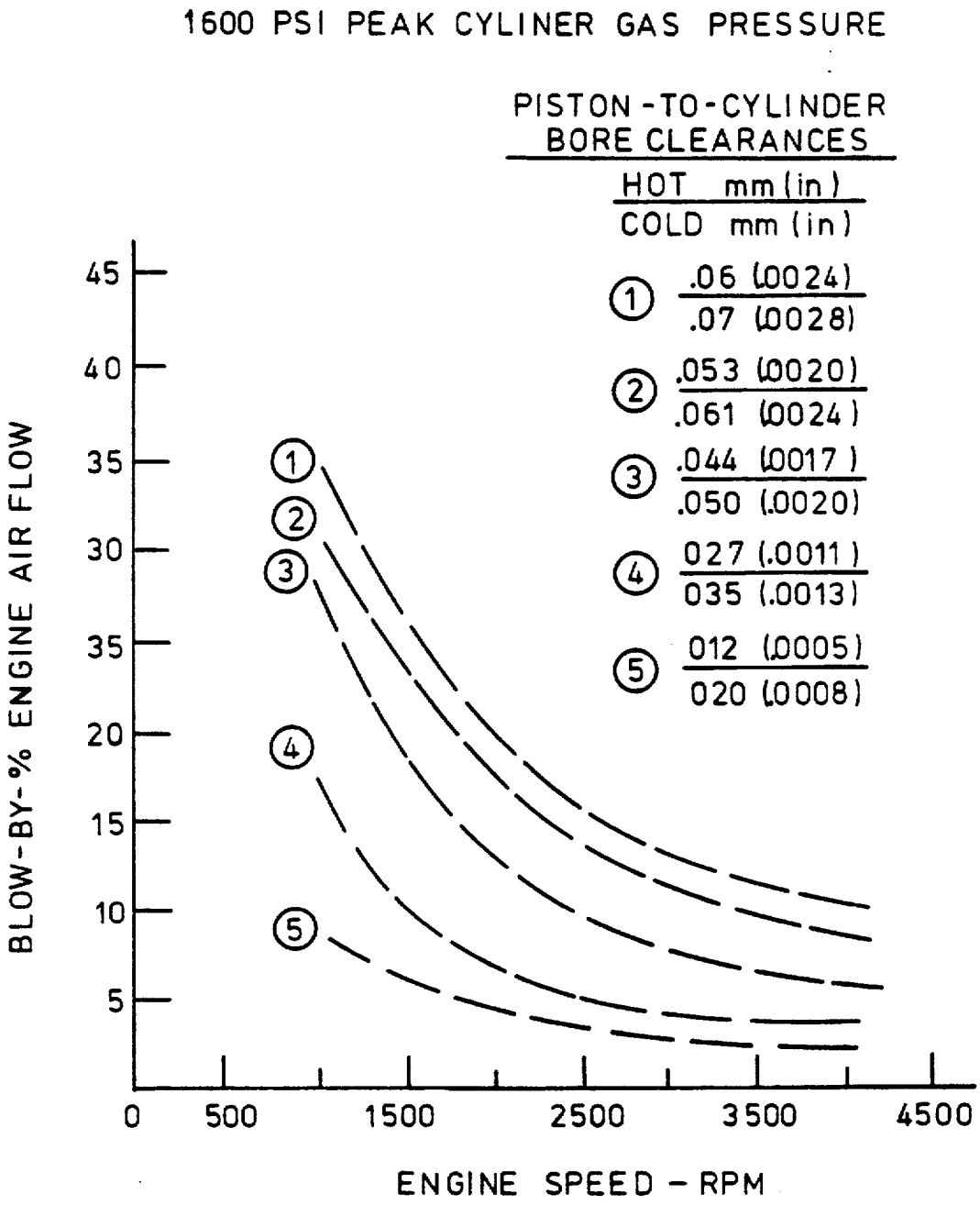
FIG. 13 is a graphical illustration of gaseous blow-by as a function of engine speed.

Secondly, the viscosity of the combustion gas charge increases as the engine goes to higher engine speeds (see FIG. 13).

Figure 15:
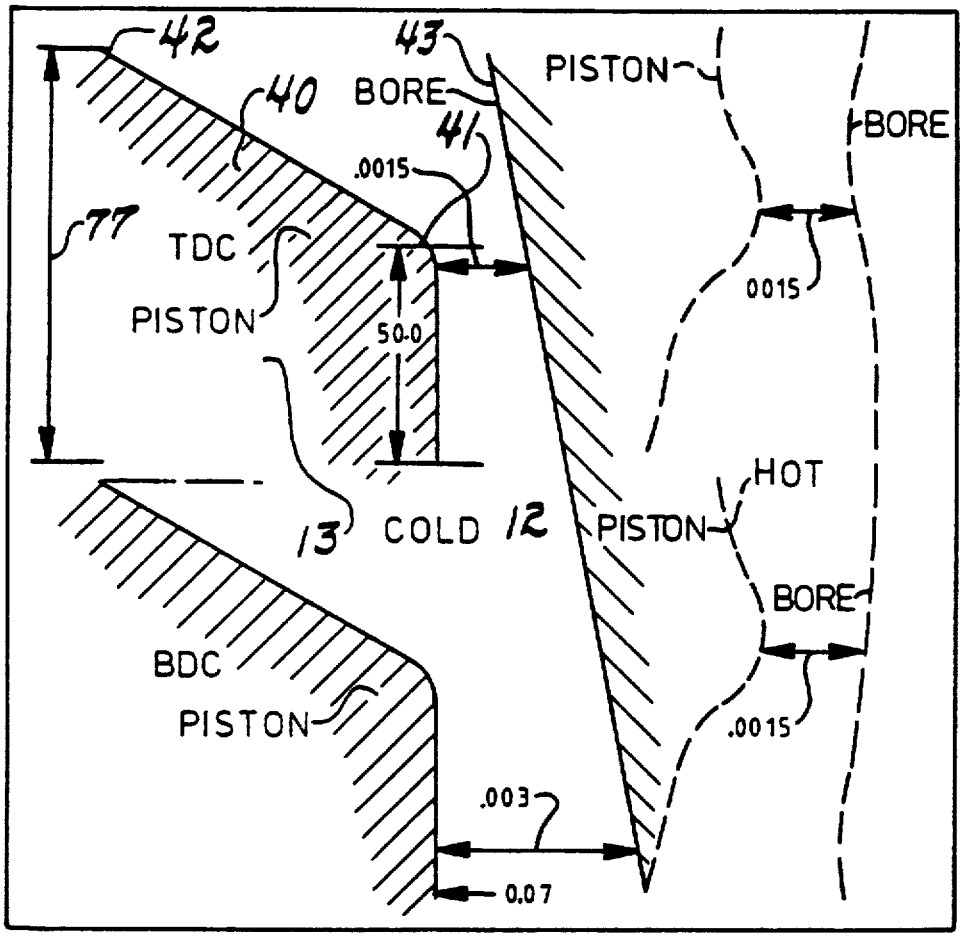
FIG. 15 is a schematic illustration of a preshaped piston and cylinder wall shown both in the ambient condition (cold) and in the hot (high speed) condition, and also in both the top dead center and bottom dead center position of the piston.

The third effect that must be considered is that even though the material selection is made to achieve good matching so that the gap does not close off, even under the maximum temperature differential experience, the gap may not remain uniform and may result in a closing effect. The gap should be maintained substantially uniform throughout the operation of the engine and the thermal gradients to be experienced. To this end, it is important that the interfacing surfaces of the piston and cylinder wall be preshaped to anticipate any thermal growth of such interfacing walls. As shown in FIG. 15, the piston crown 40 is preshaped by chamfering at its upper region (from 41 to 42) to compensate for the extreme mushrooming effect or thermal growth that will take place along the upper annular shoulder of the crown 40. The cylinder wall, experiencing thermal expansion to a lesser degree, is preshaped by tapering the wall to have its narrowest taper at the top 43.

Thus, the piston 12, in the cold condition or ambient, makes the narrowest throat or gap dimension 44 of about 0.001 inch in the top dead center position, and the gap increases to 0.003 inches in the bottom dead center position (see solid line for piston and cylinder wall representation). This gap distance remains roughly 0.0015 inches even in the hot clearance condition at high speed engine conditions because the preshaping of the piston crown and the matching of the materials ($Si_3N_4$ for the piston and $Si_3N_4$ for the cylinder wall) causes the piston to have a contour as shown in broken outline in the top dead center position which is spaced a distance of 0.0015 inches from the cylinder wall in its changed expanded condition. Even in the bottom dead center position, the spacing remains at about 0.0015 inches from the cylinder wall.

By selection of materials to have a low coefficient of thermal expansion, sizing of the gap to provide a predetermined gap at ambient conditions of 0.001±0.0005 inches, and by preshaping the interfacing walls to anticipate thermal growth, an improved gas phase squeeze film lubrication system can be provided.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of the invention.

We claim:

1. An apparatus for providing a gas phase film lubrication between a reciprocal piston and a cylinder of an uncooled oilless internal combustion engine, said piston being effective to drive a rotary crankshaft in response to an expanding gas charge, comprising:

(a) means connecting said crankshaft to said piston for transferring reciprocal thrust into rotary thrust, said means aligning said piston concentrically within said cylinder wall to limit the imposition of side loads on said piston;

(b) interfacing walls on said piston and cylinder (i) sized to provide a predetermined annular gap therebetween at ambient conditions that has a radial dimension in the range of $0.001 \pm 0.0005$ inches, (ii) consisting of matched materials that prevent closure of said gap due to thermal expansion under the maximum temperature differential to be experienced between said piston and cylinder wall, and (iii) are preshaped to anticipate any thermal growth of said interfacing walls for maintaining the annular gap substantially constant at elevated temperatures.

2. The apparatus as in claim 1, in which said means (a) comprises a pin and connecting rod linkage arranged with the axis of said crankshaft lying in a common plane with the axes of said piston and cylinder wall, all within a tolerance of 0.0004 inches.

3. The apparatus as in claim 1, in which said means (a) comprises a pin and connecting rod with antifriction connections between said pin to connecting rod, connecting rod to crank arm, and crankshaft to main bearing, the axes of said connections being maintained in parallelism with a plus or minus tolerance of 0.001 inches.

4. The apparatus as in claim 3, in which said means (a) further comprises perpendicularity between the axes of said bearings for said piston pin to connecting rod, the piston pin axis itself, and the axis of said cylinder wall, all within a tolerance of 0.0004 inches.

5. The apparatus as in claim 3, in which said means (a) further comprises maintenance of the axis of said bearing for said crankshaft to bearing caps, the axis of the bearing for said piston pin to the connecting rod, and the axis for said cylinder wall all within a common plane in a tolerance of 0.0004 inches.

6. The apparatus as in claim 1, in which the annular gap between the interfacing walls is sized to limit the blow-by of said gas phase charge to less than 2% of the flow of said charge volume.

7. The apparatus as in claim 1, in which said elevated temperature of (b) (iii) is in the range of 800°-1200° C.

8. An apparatus for providing a gas phase film lubrication between a reciprocal piston and a cylinder of an uncooled oilless internal combustion engine, said piston being effective to drive a rotary crankshaft in response to an expanding gas charge, comprising:

(a) means connecting said crankshaft to said piston for transferring reciprocal thrust into rotary thrust, said means aligning said piston concentrically within said cylinder wall to limit the imposition of side loads on said piston;

(b) interfacing walls on said piston and cylinder (i) sized to provide a predetermined annular gap therebetween at ambient conditions that has a radial dimension in the range of $0.001 \pm 0.0005$ inches, (ii) consisting of silicon nitride that prevents closure of said gap due to thermal expansion under the maximum temperature differential to be experienced between said piston and cylinder wall, and (iii) are preshaped to anticipate any thermal growth of said interfacing walls for maintaining the annular gap substantially constant at elevated temperatures.

9. An apparatus for providing a gas phase film lubrication between a reciprocal piston and a cylinder of an uncooled oilless internal combustion engine, said piston being effective to drive a rotary crankshaft in response to an expanding gas charge, comprising:

(a) means connecting said crankshaft to said piston for transferring reciprocal thrust into rotary thrust, said means aligning said piston concentrically within said cylinder wall to limit the imposition of side loads on said piston;

(b) interfacing walls on said piston and cylinder (i) sized to provide a predetermined annular gap therebetween at ambient conditions that has a radial dimension in the range of $0.00 \pm 0.0005$ inches, (ii) consisting of matched materials that prevent closure of said gap due to thermal expansion under the maximum temperature differential to be experienced between said piston and cylinder wall, and (iii) are preshaped to anticipate any thermal growth of said interfacing walls for maintaining the annular gap substantially constant at elevated temperatures, said interfacing walls being further delimited in that the material for said piston is silicon nitride and the material for the wall of the cylinder is selected from the group consisting of silicon nitride, silicon carbide and partially stabilized zirconia.

10. An apparatus for providing a gas phase film lubrication between a reciprocal piston and a cylinder of an uncooled oilless internal combustion engine, said piston being effective to drive a rotary crankshaft in response to an expanding gas charge, comprising:

(a) means connecting said crankshaft to said piston for transferring reciprocal thrust into rotary thrust, said means aligning said piston concentrically within said cylinder wall to limit the imposition of side loads on said piston;

(b) interfacing walls on said piston and cylinder (i) sized to provide a predetermined annular gap therebetween at ambient conditions that has a radial dimension in the range of $0.001 \pm 0.0005$ inches, (ii) consisting of matched materials that prevent closure of said gap due to thermal expansion under the maximum temperature differential to be experienced between said piston and cylinder wall, and (iii) are preshaped to anticipate any thermal growth of said interfacing walls for maintaining the annular gap substantially constant at elevated temperatures, said piston of said interfacing walls being preshaped to have a chamfer along the upper crown, and said cylinder wall being preshaped to have a radial taper with the smallest dimension of said taper being at the top end of said cylinder wall.

11. A method of providing gas phase squeeze film lubrication for an uncooled oilless internal combustion engine having a reciprocal piston driving a rotary crankshaft in response to an expanding gaseous mass charge to a cylinder containing the piston, comprising the steps of:

(a) assuring alignment of the driving connection of said crankshaft to said piston to provide substantial concentricity of said piston within said cylinder wall and to limit side loading of the piston to less than 80 psi;

(b) forming at least the interfacing walls on said piston and cylinder to provide an annular gap therebetween at ambient conditions which has a radial dimension in the range of 0.001±0.0005 inches, said walls having matched materials to prevent closure of said gap due to thermal expansion under the maximum temperature differential to be experienced between said piston and cylinder wall, and the interfacing wall of said piston having a length at least equal to the diameter of the piston; and (c) preshaping said walls to anticipate any thermal growth gradient of said walls for maintaining said annular gap substantially constant at elevated temperatures.

12. The method as in claim 11, in which in step (b) said walls provide an annular gap that limits blow-by of said gaseous mass charge to less than 2% of said gas flow charge volume at engine speeds above 1500 rpm.

*13. An apparatus for providing a fluid film lubrication between a reciprocal piston and a cylinder, said piston being effective to drive or be driven by a rotary crankshaft, comprising:*

*(a) means connecting said crankshaft to said piston for transferring reciprocal thrust into rotary thrust, said means aligning said piston concentrically within said cylinder to limit the imposition of side loads on said piston;*

*(b) interfacing walls on said piston and cylinder (i) sized to provide a predetermined annular gap therebetween at ambient conditions that has a radial dimension in the range of 0.001±0.0005 inches, (ii) consisting of matched materials that prevent closure of said gap due to thermal expansion under the maximum temperature differential to be experienced between said piston and cylinder, and (iii) are preshaped to anticipate any thermal growth of said interfacing walls for maintaining the annular gap substantially constant at elevated temperatures.*

*14. A method of providing fluid squeeze film lubrication for an uncooled oilless motion transmitting device having a reciprocal piston driving or driven by a rotary crankshaft, comprising the steps of:*

*(a) assuring alignment of the connection of said crankshaft to said piston to provide substantial concentricity of said piston within said cylinder and to limit side loading of the piston to less than 80 psi;*

*(b) forming at least the interfacing walls on said piston and cylinder to provide an annular gap therebetween at ambient conditions which has a radial dimension in the range of 0.001±0.0005 inches, said walls having matched materials to prevent closure of said gap due to thermal expansion under the maximum temperature differential to be experienced between said piston and cylinder and the interfacing wall of said piston having a length at least equal to the diameter of the piston; and*

*(c) preshaping said walls to anticipate any thermal growth gradient of said walls for maintaining said annular gap substantially constant at elevated temperatures.*

*15. An apparatus for providing a gas phase film lubrication between a reciprocable piston and a cylinder under conditions in which there is pressurized gas in the cylinder, said apparatus comprising:*

*(a) means for reciprocating said piston and cylinder relative to one another and for aligning said piston concentrically within said cylinder wall to limit the imposition of side loads on said piston; and*

*(b) interfacing walls on said piston and cylinder (i) sized to provide a predetermined annular gap therebetween at ambient conditions that has a radial dimension in the range of 0.001±0.0005 inches, (ii) consisting of matched materials that prevent closure of said gap due to thermal expansion under the maximum temperature differential to be experienced between said piston and cylinder wall, and (iii) are preshaped to anticipate any thermal growth of said interfacing walls for maintaining the annular gap substantially constant at elevated temperatures.*

* * * * *